(12) United States Patent
Kobuchi et al.

(10) Patent No.: US 8,496,328 B2
(45) Date of Patent: Jul. 30, 2013

(54) PROCESS FOR PRODUCING OPTICAL ARTICLE

(75) Inventors: Nobuyuki Kobuchi, Higashiosaka (JP); Nobutaka Takami, Higashiosaka (JP); Shinya Kajiri, Higashiosaka (JP)

(73) Assignee: Yamamoto Kogaku Co., Ltd., Osaka (JP)

( * ) Notice: Subject to any disclaimer, the term of this patent is extended or adjusted under 35 U.S.C. 154(b) by 103 days.

(21) Appl. No.: 12/883,412

(22) Filed: Sep. 16, 2010

(65) Prior Publication Data

US 2011/0001252 A1    Jan. 6, 2011

Related U.S. Application Data

(63) Continuation-in-part of application No. 11/528,933, filed on Sep. 27, 2006, now abandoned.

(30) Foreign Application Priority Data

Sep. 28, 2005    (JP) .................................. 2005-282294

(51) Int. Cl.
*G02C 7/12*    (2006.01)
*G02C 7/10*    (2006.01)
*G02C 7/02*    (2006.01)

(52) U.S. Cl.
USPC ............ 351/159.73; 351/159.27; 351/159.32; 351/159.56; 351/159.65

(58) Field of Classification Search
USPC .................. 351/159.27, 159.32, 159, 159.56, 351/159.65, 159.73
See application file for complete search history.

(56) References Cited

U.S. PATENT DOCUMENTS 6,066,272 A * 5/2000 Tang et al. ..................... 252/582
7,317,067 B2 * 1/2008 Ikeda et al. ..................... 528/196

FOREIGN PATENT DOCUMENTS

| | | |
|---|---|---|
| JP | 6025461 | 2/1994 |
| TW | 200423813 A | 11/2004 |
| TW | 200530327 A | 9/2005 |

OTHER PUBLICATIONS

Taiwanese Office Action, dated Oct. 26, 2012, issued in corresponding Taiwanese application No. TW 10121162620.

* cited by examiner

*Primary Examiner* — Scott J Sugarman
(74) *Attorney, Agent, or Firm* — Kenyon & Kenyon LLP

(57) ABSTRACT

The present invention provides a process for producing an optical article, comprising mixing fullerene with a thermoplastic resin powder, pelletizing the mixture using a multi-axial extruder, and injection-molding the pellets, wherein the fullerene is fullerene having a carbon number of 70 or a derivative thereof, and has an average particle diameter of 5 μm or less. An object of the present invention is to provide a process for producing a lens suitable in sunglasses or anti-glare spectacles which reduces blue hazard, and by which a blue signal can be confirmed visually, and an optical filter, and an optical article which can cut at least a part of visible light of 380 to 500 nm.

4 Claims, 1 Drawing Sheet

PROCESS FOR PRODUCING OPTICAL ARTICLE

CROSS-REFERENCE TO RELATED APPLICATION

The present application is a continuation-in-part application of U.S. patent application Ser. No. 11/528,933 which was filed on Sep. 27, 2006, now abandoned which claims benefit of and priority to Japanese Patent Application No. 2005-282294 filed Sep. 28, 2005.

BACKGROUND OF THE INVENTION

1. Field of the Invention

The present invention relates to a process for producing an optical article such as sunglasses, anti-glare lenses, shields and optical filters in which blue hazard is reduced.

2. Description of the Related Art

Sunglasses and anti-glare spectacles are used for reducing bright visible light such as sunlight, or cutting ultraviolet-ray of sunlight.

The function thereof is usually exhibited by coloring a lens base with a dye or a pigment to selectively absorb visible light, or blending an ultraviolet absorbing agent to cut ultraviolet-ray.

Alternatively, by combining with a polarizer, the function of reducing reflected light is imparted (e.g. JP-A No. 8-52817).

Adverse influence of ultraviolet-ray on eyes has been known for a long time. Fortunately, as strategy for ultraviolet-ray, there is an ultraviolet absorbing agent and, at a level of sunlight, ultraviolet-ray can be cut to a not problematic level by a method of adding an ultraviolet absorbing agent to a lens base of sunglasses or anti-glare spectacles.

In recent years, harmfulness of ultraviolet-ray scattered from a side of sunglasses or anti-glare spectacles has been stressed and, as strategy therefor, a goggle type covering a side of eyes has been put into practice.

In the case of visible light, a method of adding a pigment in place of an ultraviolet absorbing agent to a lens base has been adopted. In that case, historically, what a ratio of total visible light can be cut, that is, total visible light transmittance has been used as a criterion.

However, according to the recent study, it has been gradually known that 380 to 500 nm of visible light is harmful to eyes not to an extent of ultraviolet-ray. This is referred to blue hazard and, in sunglasses or anti-glare spectacles, it is said that cutting of this part of wavelength is preferable.

However, when a wavelength of 380 to 500 nm is completely cut, this influences on color sense of a human, it becomes difficult to confirm visually a blue color of a signal and, when one walks on the street, or drives an automobile, inconvenience is produced.

SUMMARY OF THE INVENTION

Thus, an object of the present invention is to provide a process for producing a lens which reduces blue hazard, and is suitable for sunglasses or anti-glare spectacles by which a traffic signal can be confirmed visually.

Another object of the present invention is to provide a process for producing an optical article such an optical filter which can cut at least a part of visible light of 380 to 500 nm.

In order to solve the aforementioned problems, the present inventors paid an attention to fullerene as a blue light absorbing component, resulting in completion of the present invention.

In addition, when fullerenes is dispersed in polycarbonate or the like by a wet blending method, there is a problem of conducting a step of removing a solvent also functioning as a dispersing medium. And, in the present invention, a dry blending method is selected and, in the dry blending method, there arises a problem that fullerenes is not dispersed well in polycarbonate or the like, and the present inventors intensively studied the technique of dispersing fullerenes well in polycarbonate or the like, and obtained the following findings:

(1) Average Particle Diameter of Fullerenes (i) An average particle diameter of fullerenes suitable in the present invention is 5 μm or less, preferably 4 μm or less.

(ii) The average particle diameter is an average particle diameter measured by volume frequency by light scattering diffraction method regarding fullerenes which was dispersed in water using an anionic surfactant.

More particularly, 25 g of a powder is weighed, and 0.2 ml of ethanol is added to sufficiently wet it. 2 ml of a 1 wt % anionic surfactant (dodecylbenzenesulfonic acid etc.) is added, and 8 ml of desalted water is added, followed by stirring. The prepared sample solution is measured with a laser diffraction/scattering particle size distribution measuring apparatus LA-920 manufactured by Horiba, Ltd.

(2) Pre-Dispersing Treatment of Fullerenes (i) It is preferable to subject synthesized fullerenes to mechanical grinding treatment (ball mill, colloidal mill, atomizer, jet mill etc.).

(ii) As a grinding treating machine, a dry jet mill system in which collision of fullerenes during treatment is less frequent is most preferable.

(3) As a Pelletizer or an Injection-Molding Machine, a Multiaxial Screw Kneading System is More Preferable than a Monoaxial Screw Kneading System.

That is, the present invention provides:

(1) A process for producing an optical article, comprising mixing fullerene with a thermoplastic resin powder, pelletizing the mixture using a multiaxial extruder, and injection-molding the pellets, wherein the fullerene is fullerene having a carbon number of 70 or a derivative thereof, and has an average particle diameter of 5 μm or less, (2) The process according to (1), wherein the fullerene has an average particle diameter of 4 μm or less, (3) The process according to (1) or (2), wherein the optical article is a polarizing lens, and (4) The process according to (1) or (2), wherein the optical article contains polycarbonate or transparent nylon as a main component.

According to the present invention, there can be provided a process for producing a lens which reduces blue hazard, and is suitable for sunglasses or anti-glare spectacles by which a traffic signal can be confirmed visually.

According to the present invention, there can be provided a process for producing an optical article such as an optical filter which can cut at least a part of visible light of 380 to 500 nm.

DESCRIPTION OF THE PREFERRED EMBODIMENT

Figure 1:
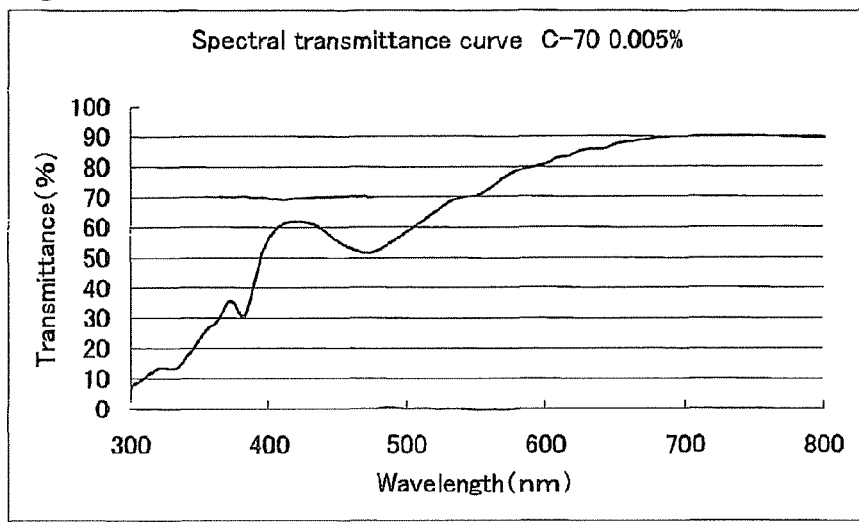
FIG. 1 is a graph showing a spectral transmittance curve of the C70 (0.005 weight part)-mixed optical article obtained in Example 1.

Fullerenes is a general name of substances in which carbon atoms form a spherical network structure. For example, when fullerene of a carbon number 60 is expressed as "C60", C70, C76, C78, C82, and C84 are known in addition to C60.

In addition, fullerenes may be chemically modified, dispersity in a resin can be modified, and optical nature or chemical nature can be changed by adding hydrogen, or imparting a hydroxy group, and any of them can be used in the present invention as far as a spectral transmittance is not considerably changed by chemical modification.

In the present invention, all fullerenes are included, and C70 or a derivative thereof is preferable due to particularly suitable spectral transmittance property.

Further, in order to attain the object of the present invention, fullerenes may by a mixture of fullerenes having different carbon numbers (and, in this case, it is preferable that C70 or a derivative thereof is contained at 10% by weight to 100% by weight).

In addition, together with fullerenes, a dyestuff other than fullerene such as dyes and pigments can be supplementally used.

In a preferable aspect of the present invention, fullerenes is contained in a resin, and the resin containing fullerenes is processed into optical articles such as lenses and optical filters of sunglasses or anti-glare spectacles.

A resin may be any of a thermoplastic resin and a thermosetting resin, and a transparent resin is preferable.

Examples of the thermoplastic resin suitably used in the present invention are not limited to, but include a polycarbonate resin, a transparent nylon resin, a polyester resin, an acryl resin, a polyurethane resin, a polystyrene resin, an acrylonitrile•styrene resin, a norbornene resin and a cellulose-based resin.

Among them, in utilities of lenses and optical filters of sunglasses or anti-glare spectacles, a polycarbonate resin and a transparent nylon resin are particularly preferable from a viewpoint of high impact resistance strength and high transparency.

In the case of a thermoplastic resin, there is a method of injection-molding a mixture of fullerenes and a powder of a thermoplastic resin or a mixture with the manufactured pellets to prepare optical articles such as lenses and optical filters of sunglasses or anti-glare spectacles.

When mixed with various resin powders, dispersity becomes a great problem. Since fullerenes are aggregated, when kneaded with a resin powder, it is necessary that a particle diameter is made to be as small as possible so that a particle diameter is 5 μm or less, preferably 4 μm or less, and an average particle diameter is around 1.7±0.05 μm.

As an extruder thereupon, a multiaxial extruder is more preferable than a monoaxial extruder.

When the present invention is applied to a polarizing lens, in a stage of preparing an optical article, one polarizer is added.

That is, when the present invention is practiced with a thermoplastic resin, usually, a monoaxially stretched polyvinyl alcohol film is used as a base for a polarizer, this is dyed with iodine or a dichromic dyestuff to prepare a polarizer, and a protective sheet made of polycarbonate, transparent nylon or acetyl cellulose is applied to both sides of a polarizer via an adhesive to prepare a polarizing plate having a sandwich structure in which a polarizer is situated at a center.

Then, a polarizing plate is bent in a lens-like manner, the polarizing plate bent in a lens-like manner is inserted into a mold of injection molding, and a thermoplastic resin such as a polycarbonate resin is imparted to a rear side of a polarizing plate in a thick manner by a so-called insert injection molding method.

In this case, as a method of containing fullerenes, in addition to a method of kneading into a thermoplastic resin to be injection-molded, there is a method of kneading into a protective sheet of a polarizing plate, or kneading into an adhesive adhering a polarizer and a protective sheet.

An addition rate of fullerenes is different depending on a kind of fullerene, use purpose of an optical article such as sunglasses and anti-glare spectacle lenses, and a place to which fullerene is added such as a lens and an adhesive, and is usually 0.5% by weight or less and, in most cases, 0.1% by weight or less. When the addition rate exceeds 0.5% by weight, there is a tendency that a visible light transmittance is considerably reduced.

Particularly, when the present invention is applied to lenses of sunglasses or anti-glare spectacles, strategy for blue hazard is attained by adding a large amount of fullerene. However, limitless addition arises a problem of making visual confirmation of a traffic signal difficult.

Then, an addition rate of fullerenes should be determined in such a range that blue hazard preventing effect is sufficient, and a traffic signal can be sufficiently confirmed visually.

According to European Standard (EN 1836) for sunglasses or anti-glare filters, blue hazard and visibility of a traffic signal are defined as follows.

Blue Hazard:

For a wavelength in a range of 380 to 780 nm of a D65 light source, let $\tau V$ represent an average luminous transmittance during the range calculated from a luminous spectral transmittance measured at 10 nm intervals.

For a wavelength in a range of 380 to 500 nm of a D65 light source, let $\tau B$ represent an average transmittance during the range calculated from a spectral transmittance measured at 10 nm intervals.

It is desirable that requirement for clearing blue hazard is $\tau B < 1.2 \tau V$.

Visibility of Signal:

Each spectral transmittance measured at 10 nm intervals for a wavelength 380 to 780 nm of a D65 light source, and each coefficient of blue, green, yellow, and red separately predetermined at 10 nm intervals for a wavelength 380 to 780 nm are multiplied every each wavelength, and a sum thereof is let to be a signal lamp recognition transmittance ($\tau$ sign) of each color.

A Q factor of each color is defined as follows.

$$Q \text{ factor} = \tau \text{ sign}/\tau V$$

Requirement for clearing visibility of a signal is as follows:
Q factor (blue) $\geq 0.4$
Q factor (green) $\geq 0.6$
Q factor (yellow) $\geq 0.8$
Q factor (red) $\geq 0.8$

EXAMPLES

The following Examples illustrate the present invention in more detail.

Example 1

0.005 part by weight of dry jet mill-processed fullerene C70 (C70 98% or more, particle diameter 5 μm or less, average particle diameter 1.7 μm) manufactured by Frontier Carbon and 100 parts by weight of a polycarbonate resin (TARFLON FN-2200 A manufactured by Idemitsu Kosan Co., Ltd.) were placed into a polyethylene bag, a mouth of the bag was closed, the bag was placed into a tumbler (BN-010 manufactured by Nissui Kako Co., Ltd.), and the tumbler was rotated for 30 minutes to mix the materials. Then, a mixed flake-like resin was placed into a hopper of a biaxial extruder (PMC45 manufactured by Ikegai Co., Ltd.), and kneading and extruding processing were performed under the condition of a cylinder temperature of 200 to 240° C., and a rotation number of 80 rpm to prepare polycarbonate resin pellets with 0.005 part by weight of C70 mixed therein.

The resin was injection-molded to mold a lens for sunglasses having an external shape 80Φ, a concave curve 65 mmR, and a central thickness of 2.51 mm, thereby, (i) an optical article with 0.005 part by weight of C70 mixed therein was obtained.

The optical article of (i) was measured with a spectrophotometer U-4100 manufactured by Hitachi, Ltd., and a transmittance τV, blue light τB, visibility of a signal were calculated. Results are shown in Table 1.

In addition, a spectral transmittance curve of the optical article with 0.005 part by weight of C70 mixed therein is shown in FIG. 1.

TABLE 1

Signal lamp recognition transmittance and Q-factor of optical article of Example 1

|  | Red | Yellow | Green | Blue |
|---|---|---|---|---|
| Signal lamp recognition transmittance | 83.88% | 79.03% | 68.13% | 65.45% |
| Q-factor | 1.16 | 1.09 | 0.94 | 0.91 |
| Determination | PASS | PASS | PASS | PASS |
| Determination standard | 0.8≦ | 0.8≦ | 0.6≦ | 0.4≦ |

According to EN 1836, τV was calculated to be 72.3% and a sunlight blue transmittance was calculated to be 56.6%, blue light τB was 1.2 τV or lower, and it was found out that there is no problem of blue hazard.

Example 2

0.1 part by weight of JF79 (ultraviolet absorbing agent manufactured by Johoku Chemical Co., Ltd.), 0.005 part by weight of dry jet mill-processed Nanom Mix MF-F (mixture of about 60% of C60, about 25% of C70, and high-order fullerenes of carbon number of 76 or more, particle diameter about 5 μm or less, average particle diameter about 1.7 μm) manufactured by Frontier Carbon, and 100 parts by weight of a polycarbonate resin (TARFLON FN-2200A (flake-like) manufactured by Idemitsu Kosan Co., Ltd.) were placed into a polyethylene bag, a mouth of the bag was closed, the bag was placed into a tumbler (BN-010 manufactured by Nissui Kako Co., Ltd.), and the tumbler was rotated for 30 minutes to mix the materials. Then, the mixed flake-like resin was placed into a hopper of a biaxial screw-type extruder (PMC45 manufactured by Ikegai Co., Ltd.), and kneading and extrusion were performed under the condition of Example 1 to obtain polycarbonate resin pellets with fullerenes mixed therein.

The resin was injection-molded to mold a lens for sunglasses having an external shape 80Φ, a concave curve 65 mmR, and a central thickness of 2.15 mm) and, thereby, an optical article with 0.005 part by weight of MF-F mixed therein was obtained.

Comparative Example 1

0.1 part by weight of JF79 (ultraviolet absorbing agent manufactured by Johoku Chemical Co., Ltd.), 0.005 part by weight of not dry jet mill-processed Nanom Mix MF-S (mixture of about 60% of C60, about 25% of C70, and high-order fullerenes of carbon number of 76 or more, particle diameter about 30 μm or less, average particle diameter about 7 μm) manufactured by Frontier Carbon, and 100 parts by weight of a polycarbonate resin (TARFLON FN-2200A (flake-like) manufactured by Idemitsu Kosan Co., Ltd.) were placed into a polyethylene bag, a mouth of the bag was closed, the bag was placed into a tumbler (BN-010 manufactured by Nissui Kako Co., Ltd.), and the tumbler was rotated for 30 minutes to mix the materials. Then, the mixed flake-like resin was placed into a hopper of a biaxial screw-type extruder (PMC45 manufactured by Ikegai Co., Ltd.), and kneading and extrusion were performed under the condition of Example 1 to obtain polycarbonate resin pellets with fullerenes mixed therein.

The resin was injection-molded to mold a lens for sunglasses having an external shape 80Φ, a concave curve 65 mmR, and a central thickness of 2.15 mm and, thereby, an optical article with 0.005 part by weight of MF-S mixed therein was obtained.

Example 3

0.1 part by weight of JF79 (ultraviolet absorbing agent manufactured by Johoku Chemical Co., Ltd.), 0.05 part by weight of dry jet mill-processed Nanom Mix MF-F (mixture of about 60% of C60, about 25% of C70, and high-order fullerenes of carbon number of 76 or more, particle diameter about 5 μm or less, average particle diameter about 1.7 μm) manufactured by Frontier Carbon, and 100 parts by weight of a polycarbonate resin (TARFLON FN-2200A (flake-like) manufactured by Idemitsu Kosan Co., Ltd.) were placed into a polyethylene bag, a mouth of the bag was closed, the bag was placed into a tumbler (BN-010 manufactured by Nissui Kako Co., Ltd.), and the tumbler was rotated for 30 minutes to mix the materials. Then, the mixed flake-like resin was placed into a hopper of a biaxial screw-type extruder (PMC45 manufactured by Ikegai Co., Ltd.), and kneading and extrusion were performed under the condition of Example 1 to obtain polycarbonate resin pellets with fullerenes mixed therein.

The resin was injection-molded to mold a lens for sunglasses having an external shape 80Φ, a concave curve 65 mmR, and a central thickness of 2.15 mm and, thereby, an optical article with 0.05 part by weight of MF-F mixed therein was obtained.

Comparative Example 2

0.1 part by weight of JF79 (ultraviolet absorbing agent manufactured by Johoku Chemical Co., Ltd.), 0.005 part by weight of dry jet mill-processed Nanom Mix MF-F (mixture of about 60% of C60, about 25% of C70, and high-order fullerenes of carbon number of 76 or more, particle diameter about 5 μm or less, average particle diameter about 1.7 μm) manufactured by Frontier Carbon, and 100 parts by weight of a polycarbonate resin (TARFLON FN-2200A (flake-like) manufactured by Idemitsu Kosan Co., Ltd.) were placed into a polyethylene bag, a mouth of the bag was closed, the bag was placed into a tumbler (BN-010 manufactured by Nissui Kako Co., Ltd.), and the tumbler was rotated for 30 minutes to mix the materials. Then, the mixed flake-like resin was placed into a hopper of a monoaxial screw-type extruder (P-105 manufactured by Nippon Steel Corporation), and kneading and extrusion were performed under the condition of a cylinder temperature of 200 to 240° C., and a rotation number of 80 rpm to obtain polycarbonate resin pellets with fullerenes mixed therein.

The resin was injection-molded to mold a lens for sunglasses having an external shape 80Φ, a concave curve 65 mmR, and a central thickness of 2.15 mm and, thereby, an optical article with 0.005 part by weight of MF-F mixed therein was obtained.

Example 4

In addition, a polarizing sheet made of polycarbonate (PGC-1301; manufactured by Tsutsunaka Plastic Industry Co., Ltd., thickness 0.8 mm) was bending-processed into a sphere of 65 mmR, inserted into a mold, and molded with a polycarbonate resin with 0.005 part by weight of MF-F mixed therein of Example 2 to obtain MF-F 0.005 weight part-mixed+polarizing sheet optical article having an external shape of 82Φ, a concave curve of 65 mmR, and a central thickness of 2.15 mm.

An appearance of external shape 80Φ lenses obtained in Example 1 to Example 4 and Comparative Examples 1 and 2 was visually examined.

In lenses of Comparative Example 1 and Comparative Example 2, dispersion was bad, there was color ununiformity, a black point was generated, and those lenses were in the state where they could not be used as a lens, while in each lens of Examples 1 to 4, the dispersed state was better, neither color ununiformity nor black point was generated, and those lenses could be used as a lens.

Optical articles of Example 2, Example 3 and Example 4 were measured with a spectrophotometer U-4100 manufactured by Hitachi, Ltd. and, based on sunglasses standard of EN (Europe)•ANSI (USA)•AS (Australia), a spectral transmittance, a blue light transmittance, and visibility of a signal of each of them were calculated. Results on EN Standard are shown in Table 2, results on ANSI Standard are shown in Table 3, and results on AS Standard are shown in Table 4.

TABLE 2

Results on EN Standard

| | | | Example 2 | | Example 3 | | Example 4 | |
|---|---|---|---|---|---|---|---|---|
| | | | Measured value | Determination | Measured value | Determination | Measured value | Determination |
| EN 1836 | Luminous Transmittance $\tau V(\%)$ | | 77.9 | — | 27.5 | — | 24.6 | — |
| | Filter Category | | 1 | — | 2 | — | 2 | — |
| | Sunlight UV transmittance (280~380) nm | | 0.00 | PASS | 0.00 | PASS | 0.00 | PASS |
| | Blue light (380~500) % Blue light transmittance (1.2 $\tau V > \tau B$) | | 64.2 | (PASS) | 6.6 | (PASS) | 21.8 | (PASS) |
| | For Drive(500~650) nm 0.2 $\tau V <$ | | 71.2 | PASS | 11.0 | PASS | 23.7 | PASS |
| | Minimum of relative luminous attenuation coefficient of signal lamp recognition (Q-FACTOR) | Red 0.8≦ | 1.08 | PASS | 1.76 | PASS | 1.04 | PASS |
| | | Yellow 0.8≦ | 1.04 | PASS | 1.38 | PASS | 1.02 | PASS |
| | | Green 0.6≦ | 0.97 | PASS | 0.76 | PASS | 0.99 | PASS |
| | | Blue 0.4≦ | 0.96 | PASS | 0.74 | PASS | 1.01 | PASS |

TABLE 3

Results on ANSI Standard

| | | | Example 2 | | Example 3 | | Example 4 | |
|---|---|---|---|---|---|---|---|---|
| | | | Measured value | Determination | Measured value | Determination | Measured value | Determination |
| ANSI Z80.6 | Luminous Transmittance $\tau V(\%)$ | | 78.0 | — | 27.7 | — | 24.7 | — |
| | Kind | | Cosmetic Use | | General Purpose | | General Purpose | |
| | Sunlight UVB transmittance UVB(290~315) nm | | 0.00 | PASS | 0.00 | PASS | 0.00 | PASS |
| | Sunlight UVA transmittance UVA(315~380) nm | | 0.00 | PASS | 0.00 | PASS | 0.00 | PASS |

TABLE 3-continued

Results on ANSI Standard

|  |  | Example 2 | | Example 3 | | Example 4 | |
| --- | --- | --- | --- | --- | --- | --- | --- |
|  |  | Measured value | Determination | Measured value | Determination | Measured value | Determination |
| Minimum of signal lamp recognition transmittance Color coordinate (X and Y) | Red 8%≦ | 85.3 | PASS | 55.65 | PASS | 26.6 | PASS |
|  | Yellow 6%≦ | 81.3 | PASS | 37.58 | PASS | 25.1 | PASS |
|  | Green 6%≦ | 75.9 | PASS | 21.1 | PASS | 24.4 | PASS |
|  | D65 | X = 0.333 Y = 0.348 | PASS | X = 0.452 Y = 0.410 | PASS | X = 0.323 Y = 0.342 | PASS |
|  | Yellow | X = 0.570 Y = 0.419 | PASS | X = 0.611 Y = 0.379 | PASS | X = 0.570 Y = 0.409 | PASS |
|  | Green | X = 0.217 Y = 0.420 | PASS | X = 0.298 Y = 0.520 | PASS | X = 0.210 Y = 0.413 | PASS |

TABLE 4

Results on AS Standard

|  |  |  | Example 2 | | Example 3 | | Example 4 | |
| --- | --- | --- | --- | --- | --- | --- | --- | --- |
|  |  |  | Measured value | Determination | Measured value | Determination | Measured value | Determination |
| AS 1076 | Luminous Transmittance τV(%) | | 77.9 | — | 27.5 | — | 24.6 | — |
|  | Lens Category | | 1 | — | 2 | — | 2 | — |
|  | Sunlight UV transmittance τSUV(280~400) nm | | 0.11 | PASS | 0.01 | PASS | 0.09 | PASS |
|  | Solar blue light τSB % (400~500) nm | | 64.3 | — | 6.56 | — | 21.8 | — |
|  | Minimum Transmittance (450~650) nm 0.2 τV< | | 66.5 | PASS | 6.3 | PASS | 21.9 | PASS |
|  | Minimum of relative luminous attenuation coefficient of signal lamp recognition (Q-FACTOR) | Red 0.8≦ | 1.08 | PASS | 1.76 | PASS | 1.04 | PASS |
|  |  | Yellow 0.8≦ | 1.04 | PASS | 1.38 | PASS | 1.02 | PASS |
|  |  | Green 0.6≦ | 0.97 | PASS | 0.76 | PASS | 0.99 | PASS |
|  |  | Blue 0.7≦ | 0.96 | PASS | 0.74 | PASS | 1.01 | PASS |

Figure 2:
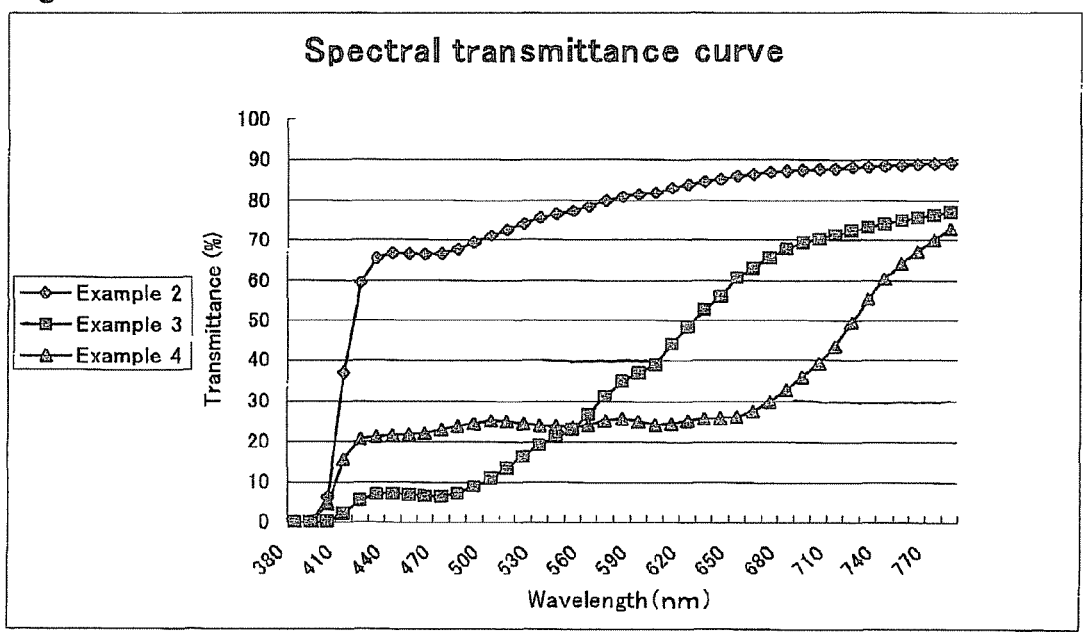
FIG. 2 is a graph showing each spectral transmittance curve of the MF-F (0.005 weight part)-mixed optical article obtained in Example 2, the MF-F (0.05 weight part)-mixed optical article obtained in Example 3, and the MF-F (0.005 weight part)-mixed+polarizing sheet optical article obtained in Example 4.

A view of a spectral transmittance curve of an optical particle with 0.005 part by weight of MF-F mixed therein of Example 2, an optical particle with 0.05 part by weight of MF-F mixed therein of Example 3, and MF-F 0.005 weight part-mixed+polarizing sheet optical article of Example 4 are shown in FIG. 2.

An optical particle with MF-F 0.005 part by weight mixed therein of Example 2, an optical particle with 0.05 part by weight of MF-F mixed therein of Example 3, and MF-F 0.005 weight part-mixed+polarizing sheet optical article of Example 4 satisfied Standard of each country, and suitably reduced blue light of 380 to 500 nm from a spectral curve.

Optical articles of Examples 2 to 4 were cut into a lens shape, and actually used as a completed sunglass article. A lens had no defect such as black point, color ununiformity and the like, and had the better dispersed state. Since in a field test, blue light was suitably reduced, scattered light was suppressed, contours of far buildings or clouds were seen clearly, being comfortable. In addition, a blue signal could be sufficiently confirmed visually, and it was confirmed that yellow and red signals can be discriminated without any problem.

According to the present invention, a process for producing a lens which can reduce blue hazard, and is suitable for sunglasses or anti-glare spectacles by which a blue signal can be confirmed visually, can be provided, In addition, according to the present invention, a process for producing an optical article such as an optical filer which can cut at least a part of visible light of 380 to 500 nm can be provided.

What is claimed is:

1. A process for producing an optical article, comprising:
   mixing fullerene with a thermoplastic resin powder,
   pelletizing the mixture using a multiaxial extruder, and
   injection-molding the pellets, wherein the fullerene is fullerene having a carbon number of 70 or a derivative thereof, and has a particle diameter of 5 μm or less, and an average particle diameter is 1.7±0.05 μm.

2. The process according to claim 1, wherein the fullerene has a particle diameter of 4 μm or less.

3. The process according to claim 1 or 2, wherein the optical article is a polarizing lens.

4. The process according to claim 1 or 2, wherein the optical article contains polycarbonate or transparent nylon as a main component.

\* \* \* \* \*